Dec. 11, 1951          D. TAUBÉ          2,578,637
MACHINE FOR CUTTING SHEET MATERIALS
Filed Dec. 15, 1948          4 Sheets-Sheet 1
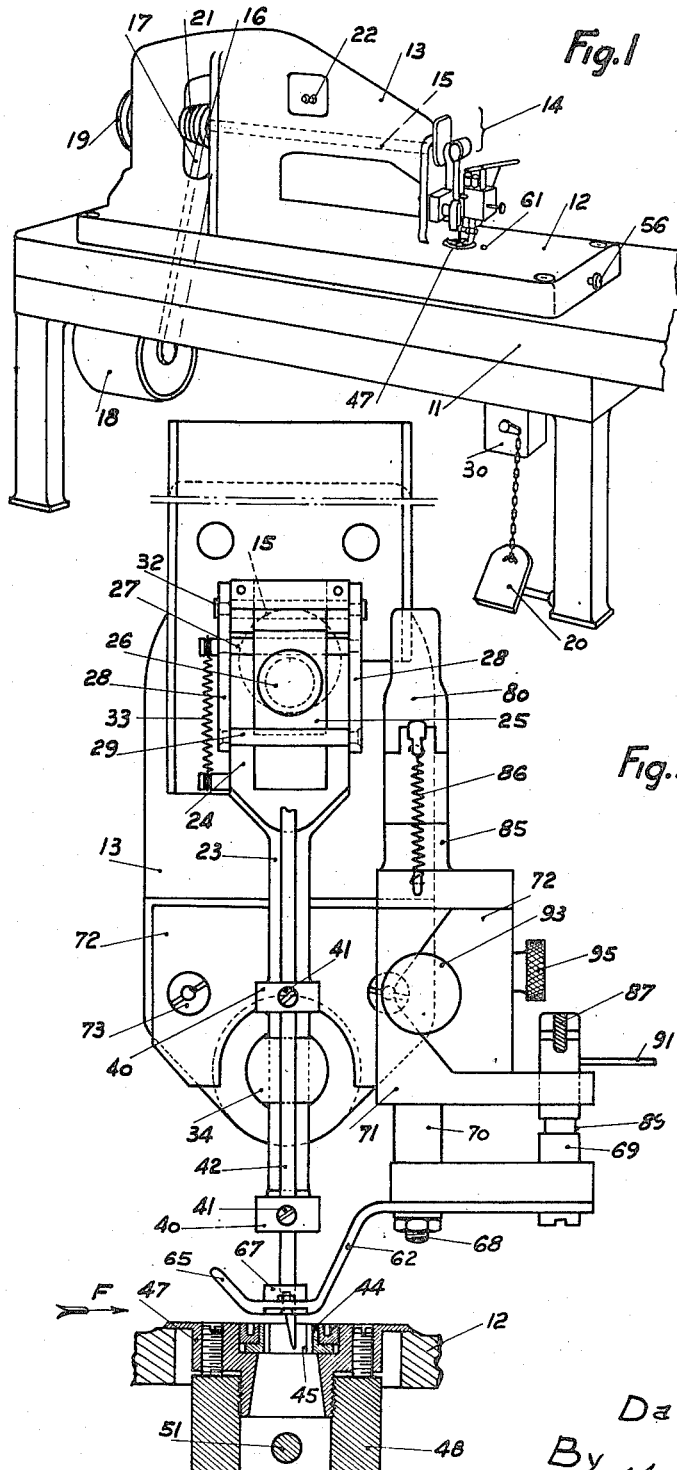
Inventor
David Taubé
By Young, Emery & Thompson
Attys.

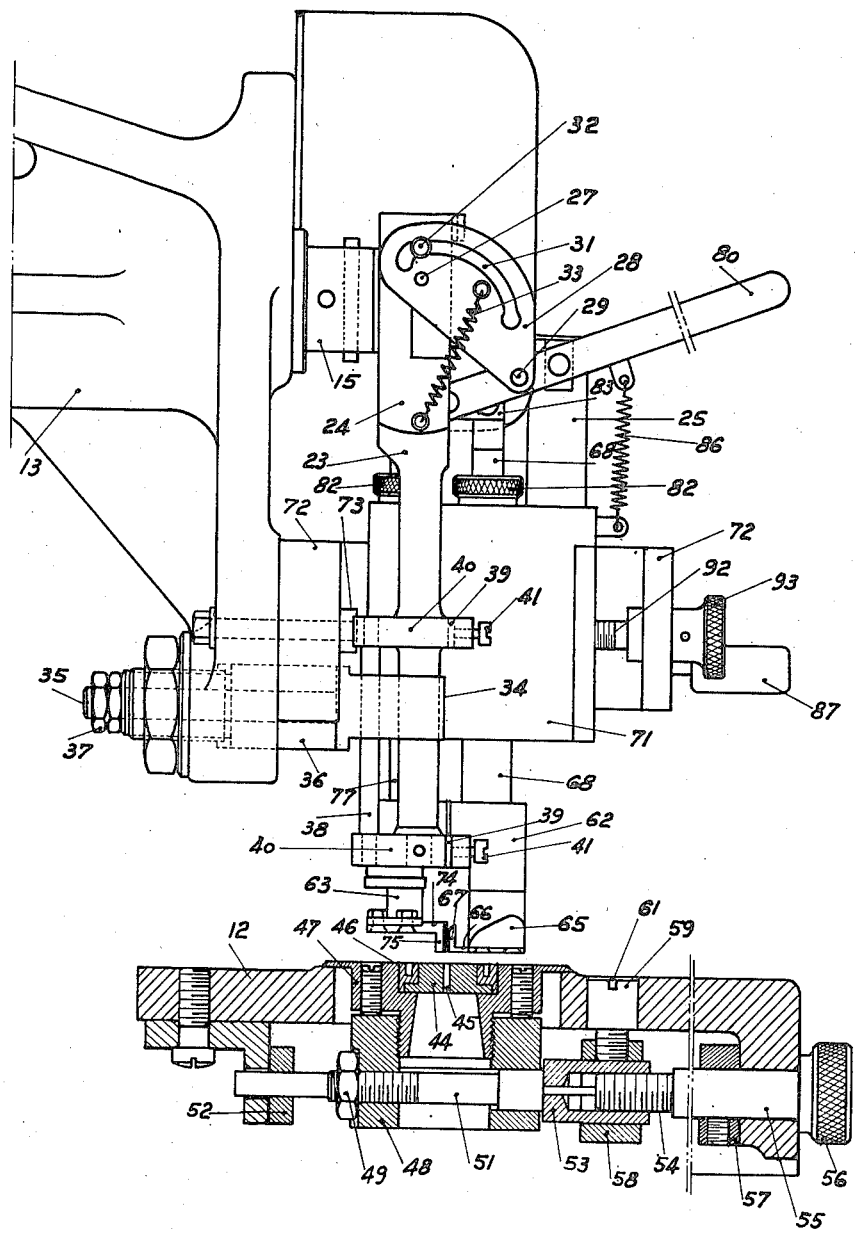

Dec. 11, 1951  D. TAUBÉ  2,578,637
MACHINE FOR CUTTING SHEET MATERIALS
Filed Dec. 15, 1948  4 Sheets-Sheet 3

Inventor
David Taubé
By Young, Emery + Thompson
Attys.

Dec. 11, 1951           D. TAUBÉ           2,578,637
MACHINE FOR CUTTING SHEET MATERIALS
Filed Dec. 15, 1948           4 Sheets—Sheet 4
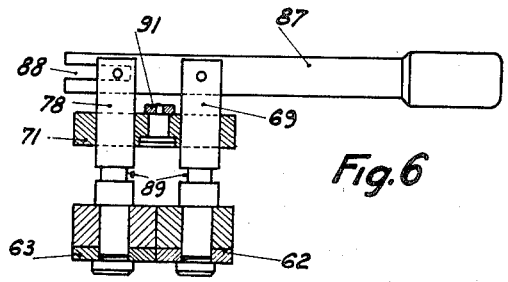
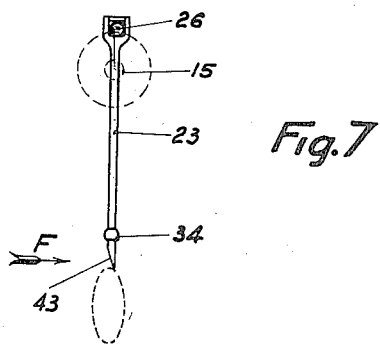
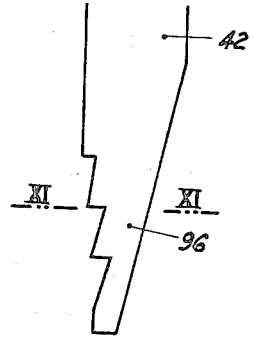
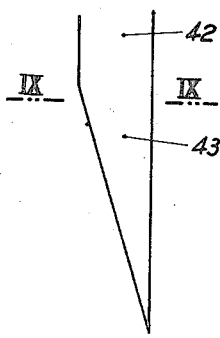

Patented Dec. 11, 1951

2,578,637

UNITED STATES PATENT OFFICE 2,578,637

MACHINE FOR CUTTING SHEET MATERIALS

David Taubé, Paris, France

Application December 15, 1948, Serial No. 65,346
In France January 16, 1948

3 Claims. (Cl. 164—53)

This invention relates to an improved machine for cutting easily, quickly and accurately sheet materials such as cardboard, leather, soft metals, etc.

Said machine ensures the simultaneous cutting of a number of sheets bundled up above each other along an outline which may be either drawn on the upper sheet exposed to the operator's sight or embodied by a pattern applied on the bundle of stacked sheets.

The machine comprises essentially a narrow cutter rigidly secured to a connecting-rod which is on the one hand made to pass slidably through a fixed point and on the other hand connected at one end to a crank-pin or eccentric-pin imparted with a continuous rotary motion due to which the cutter edge which is located towards the other end of the connecting-rod beyond the fixed point is made to describe a loop path the shape of which is similar to that of an ellipse of which the major axis would be equal to the double of the pin eccentricity while its minor axis would have a length determined by the ratio of the respective distances of the cutting edge and fixed point with respect to the rotation axis of the pin.

The machine comprises a work table which receives the sheets to be cut and which is provided with a slot preferably adjustable in position and into which penetrates the end of the cutting edge of the cutter.

According to one embodiment the machine also comprises a spring-loaded presser-foot arranged above the work table in the close neighborhood of the cutter so as to exert a vertical pressure upon the sheets in the working area of the cutter. Said presser-foot comprises preferably two arms independent of each other so that they may be set at different levels and to permit the cutting of the sheets by means of a pattern applied thereupon. Said pattern is engaged together with the sheet stack under one arm of the presser-foot while the other arm merely bears against the portion of the sheets which projects out of the pattern outline.

Devices for lifting simultaneously or independently of each other the arms of the presser-foot with facility for locking them in the top position are also provided for completing the utilization range of the machine.

Other minor features of the machine will appear in the following specification relating to one embodiment shown as an illustration in the appended drawings wherein:

Fig. 1 is a perspective view of the machine assembly.

Fig. 2 is a side view of the cutting head.

Fig. 3 is a front view of the cutting head.

Fig. 6 is a sectional view of the presser-foot along line VI—VI of Fig. 4.

Fig. 7 is a diagram showing the path described by the cutting edge of the cutter during operation.

Figs. 8 and 10 are views of two embodiments of the cutting edge of the cutter.

Figs. 9 and 11 are sectional views along lines IX—IX and XI—XI of Figs. 8 and 10, respectively.

Figure 4:
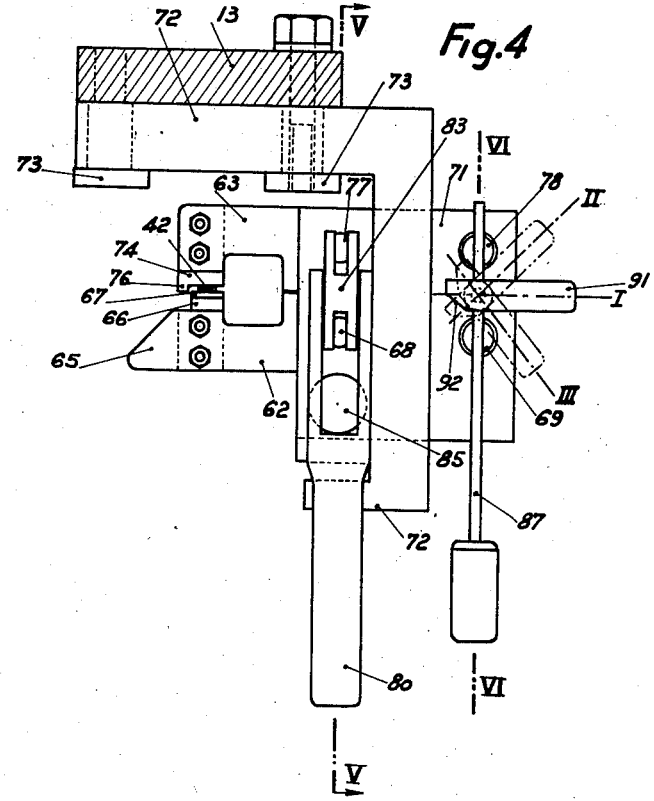
Fig. 4 is a plan view of the presser-foot.

The machine shown in Fig. 1 is assumed to be mounted on a work-bench 11; it comprises a baseplate or working table 12 surmounted by a swan-neck 13 and at one end of which is located the cutting head 14.

At said head end is a shaft 15 (Fig. 2) which is supported by swan-neck 13 and which carries a pulley 16 over which runs a driving belt 17 driven by an electric motor 18 secured on or under work-bench 11. At the end remote from the cutting head swan-neck 13 comprises a grinding-wheel 19 for sharpening the cutter. A clutch 21 allows shaft 15 to drive said grinding-wheel when required. The starting and stopping of the machine are effected either by hand through a switch 22 located on swan-neck 13 or by foot through a pedal 20 which controls a rheostat 30 interposed in the circuit of motor 18 for varying the speed of the machine.

The cutting head as shown more particularly in Figs. 2 and 3 comprises as its main part a connecting-rod 23 forming at its upper portion a fork 24 between the arms of which is held a bronze block 25. Said block acts as a bearing for the wrist-pin 26 of an eccentric which is provided at the end of shaft 15 of the machine. The eccentricity of wrist-pin 26 is relatively small: about 3 millimeters in the conventional or usual machines.

Block 25, already guided in fork 24 is integral with a pin 27 which passes freely through fork 24 in two longitudinal slots and which acts as a rotation axle for two flanges 28 interconnected by an outer cross-bar 29. Each flange 28 comprises a slot 31 offset with respect to the axis of pin 27 and into said slots 31 are engaged the ends of a pin 32 independent of block 25 while integral with fork 24 of connecting-rod 23. A spring 33 secured on the one hand to connecting-rod 23 and on the other hand to one flange 28 continuously draws back said flanges towards the position shown in Figs. 2 and 3. Connecting-rod 23 extends towards working table 12 and in its lower third portion it passes through a lug 34 projecting backwards as a horizontal rod 35 easily fitted in a sleeve 36 secured on swan-neck 13 of the machine. Said lug is prevented from effecting any sliding motion by nuts 37 while it can freely rotate about the axis of rod 35.

In order to prevent the connecting-rod 23 from being able to rotate within lug 34 said connecting-rod is provided with a vertical rod 38 slightly parallelly offset and also passing through lug 34.

Above and under lug 34 connecting-rod 23 is provided with two collars or bosses 40 in each of which is provided a slot such as 39 with a set screw 41; this arrangement makes it possible to secure to connecting-rod 23 parallelly thereto a cutter 42 (Fig. 3) formed at its lower end with a sharp cutting edge 43 (Figs. 8 to 11).

Opposite to cutter 42 the working table 12 comprises a steel pad 44 provided with a slot 45 into which may enter the cutting edge 43 of cutter 42.

Pad 44 is held by a threaded circular ring 46 in a stage 47 housed with clearance in table 12 and secured by screwing in a carriage 48 held by a nut 49 on a rod 51 capable of sliding horizontally in a bearing 52 secured under table 12.

Rod 51 comprises a threaded and slotted sleeve 53 into which enters the threaded end 54 of another rod 55 supported by table 12 and ended by a control knob 56. Rod 55 may rotate about its own axis but it is prevented from effecting any longitudinal motion by a holding ring 57.

Around the slotted sleeve 53 is provided a collar 58 having a screw 59 the head of which is engaged into a hole 61 of working table 12. Said screw when screwed down locks sleeve 53 on the threaded bearing 54 so that carriage 48, stage 47 and pad 44 are then secured against motion.

The head of the machine also comprises a presser-foot constituted by two arms 62 and 63 between which passes cutter 42 as shown in Fig. 4. The presser-foot arm 62 comprises an engagement nose 65 which is slightly bended upwards (Fig. 3). Said nose is followed by a horizontal portion provided with a small plate 66 which extends along cutter 42 against which bears an upwardly bent right-angled portion 67.

At its other end arm 62 of the presser-foot is secured on two parallel rods 68 and 69 which engage into a block 71 supported by a right-angled bracket 72 secured on swan-neck 13 by means of bolts provided with nuts 73 (Fig. 3).

The other arm 63 of the presser-foot comprises no engagement nose but it is provided with a horizontal small plate 74 which extends against cutter 42 along a right-angled portion 75 directed downwards (Fig. 2).

As shown in the plan view of Fig. 4 it may be seen that in front of cutter 42 the small plate 74 is formed with a step 76 which projects correspondingly to the thickness of cutter 42.

Similarly to arm 62 of the presser-foot arm 63 is secured on two parallel rods 77 and 78 engaging into block 71 described above.

Figure 5:
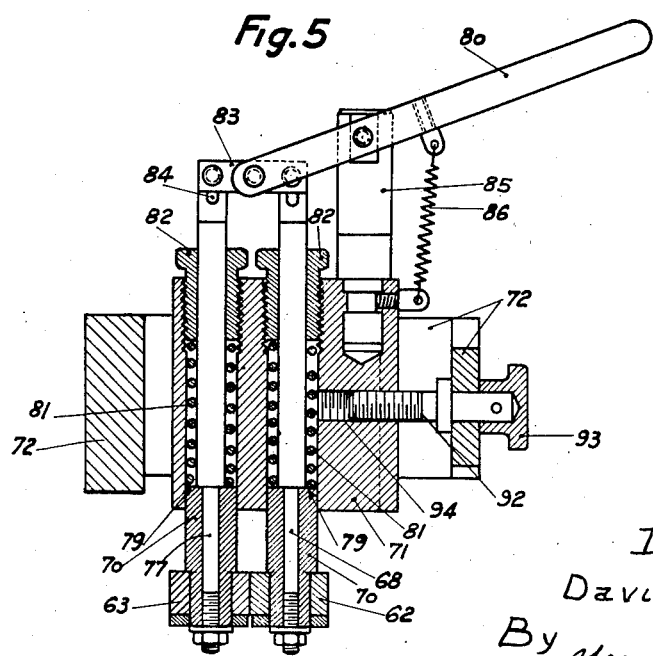
Fig. 5 is a sectional view of the presser-foot taken along line V—V of Fig. 4.

As shown in the sectional view of Fig. 5 rods 68 and 77 are similar and are surrounded at their lower portion by sleeves 70 acting as cross-bars engaged partly into block 71 so that each of them constitutes a shoulder 79 acting as a stop for a spring 81 surrounding the rod and compressed by means of a nut 82 screwed into block 71. At their upper portion rods 68 and 77 are interconnected by a cross-bar 83. The linking of said cross-bar on each rod takes place in a slot such as 84 so that the motions of rods 68 and 77 may be relatively independent of each other.

Cross-bar 83 is secured at its mid-point on the end of a simultaneous lifting lever 80 pivotally connected to a strap 85 secured on block 71. A light spring 86 urges continuously said lever 80 downwards but its action is of course unsufficient to overcome that of springs 81 of the rods.

Rods 69 and 78 pass through block 71 and at their upper end they are pivotally connected to an individual lifting lever 87. As shown in Fig. 6, one of these connections takes place in a slot 88 due to which the pivoting motion of lever 87 may be translated into a relative straight motion of rods 69 and 78 in either direction.

Each one of rods 69 and 78 is provided at the suitable place with a groove 89; moreover between rods 69 and 78 block 71 bears a pivoting latch 91 one end of which is truncated at 92 opposite to rod 69.

The position of block 71 on bracket 72 is preferably adjustable; for this purpose, as shown in Fig. 5 a screw 92 provided with a head 93 is supported by bracket 72 so that it can rotate about its own axis without any longitudinal motion; on the other hand said screw is engaged into a threaded bearing 94 of block 71. Thus the rotation of said screw results in a sliding of block 71 on bracket 72. A set screw 95 (Fig. 3) ensures the fixation of block 71 in the suitable position.

The operation of the machine described above is as follows:

Motor 18 being started through actuation of switch 22 or pedal 20 which acts upon rheostat 30, shaft 15 rotates and therewith the offset wrist-pin 26. The upper portion of connecting-rod 23 thus describes a circular path having as a radius the eccentricity of the wrist-pin. Since on the other hand connecting-rod 23 is made to pass through lug 34, it alternately slides therein in one direction and then in the opposite direction while lug 34 oscillates about the axis of rod 35. All points of the connecting rod thus describe loop curves and considering in particular the cutting edge 43 of cutter 42 secured along the connecting-rod it may be seen referring to the diagram of Fig. 7 that its path is a curve having a shape similar to that of an ellipse of which the major axis would be equal to the diameter of the circumference described by wrist-pin 26 and of which the minor axis is the shorter as the cutting edge is nearer to lug 34.

The machine makes use of this particular motion of the cutting edge 43 to cut the sheet materials which are slided towards said cutting edge on the working table 12 in the direction of arrow F of Figs. 3 and 7. The upper half of the curve constitutes the stroke during which the material is cut; the lower half of the curve corresponds to the backwards motion of the cutter which is used by the operator for feeding the material for the next cutting stroke. It is to be noted that the cutting edge wipes upon the material which has just been cut so that in its backwards stroke it tends to draw the material with it so that the feeding force to be exerted by the operator is substantially nul; the operator has thus only to guide the material instead of pushing it; he can also concentrate his attention to follow the outline of the drawing or pattern along which the material is to be cut.

The reaction of the material upon the cutter generates in the connecting-rod a torque which tends to rotate it in lug 34 but which is counterbalanced by the presence of the vertical rod 38.

During the upwards stroke of the tool it is necessary that the material is not stripped off. This is the reason why the two arms 62 and 63 of the presser-foot pushed back towards table 12 by springs 81 are intended for holding the material on the table. When the outline along which the cutting is to be made is merely drawn on the upper sheet of the bundle both arms 62 and 63 always remain at the same level. But in most cases the cutting is effected by means of a pattern of the required shape laid flat on the sheet bundle; under these conditions arm 62 of the presser-foot presses both on the pattern and on the sheets while arm 63 only presses on the sheets so that it remains at a lower level which justifies the independence of the two arms 62 and 63. The pressure of the arms of the presser-foot is adjusted according to the thicknesses of the bundle of sheets and pattern by means of nuts 82.

During the cutting along a pattern said pattern should remain tangent to cutter 42 so that the latter can not cut into the pattern; it is for this purpose that it has been provided on the small plate 74 of arm 63 a step 76 against which the pattern is stopped. When the outline to be cut comprises reentrant curves having small radii it sometimes happens that the pattern should be partly engaged under arm 63 of the presser-foot; this is the reason why the small plate 74 of said arm 63 comprises a downwardly directed flange 75; the clearance required for the eventual accommodation of the pattern is thus provided.

To engage the material under the arms of the presser-foot at the beginning of the work said arms are simultaneously lifted by means of the lifting lever 80 by moving said lever downwards.

When the cutting is to be effected within the sheets it is necessary to lift the cutter before laying the sheets on table 12; for this purpose the cross-bar 29 is lifted so as to tilt flanges 28; thanks to slopes 31 the connecting-rod and the cutter are lifted with respect to block 25. After having engaged the sheets to be cut under the presser-foot, cross-bar 29 is lowered back; the connecting-rod moves downwards and the cutter drills the sheet bundle at the required point; the work may then be effected.

However when the material is very hard it is preferred to provide previously a hole at the point where the cutter is to be engaged.

During the work the presser-foot is often subjected to transversally directed pressures. Such is the case in particular when the cutter drills the sheet bundle as just described and thus tends to bend by buckling. Similarly when the cutting is effected along a pattern in order that the cutter closely follows the outline of said pattern the operator should push the assembly of the sheet bundle and pattern transversally toward step 76. However in any case the two arms of the presser-foot must remain in the required position on either side of the cutter and parallelly to its lateral faces; this is the reason why the guiding rods 69 and 78 have been provided. Now the presence of said rods is also used for providing the permanent lifting of arm 63 or of both arms of the presser-foot. For example when the pattern is so thick that its eventual passage under arm 63 of the presser-foot would be impossible or when the outline to be cut has areas where the bending radius is too small for not being hindered by flange 75 and step 76, lever 87 is acted upon downwardly until groove 89 of rod 78 reaches the level of latch 91 and said latch is pivoted to the position shown at II in Fig. 4. Said latch is engaged into groove 89 and maintains arm 63 of the presser-foot in the lifted position. Since latch 91 is truncated at 92 rod 69 does not hinder said pivoting motion.

If it is desired to maintain simultaneously lifted the two arms of the presser-foot lever 80 is lowered and latch 91 is pivoted to position III of Fig. 4; said latch is then engaged into grooves 89 of both rods 69 and 78 and maintains the presser-foot lifted. In this position it is possible to effect with some care the cutting at sight of the sheet material.

In position I of latch 91 the presser-foot is free to press on the sheets to be cut.

In order that the cutting be sharp and so that the useful portion of the cut sheets be free of burrs it is essential that the face of cutter 42 directed towards the right-hand side of Fig. 2 be closely in contact with the corresponding wall of slot 45 of the pad 44. Thus if a burr is formed it will be located on the rejected portion and will have no disadvantage. To obtain this result pad 44 must be brought into the required position with respect to cutter 42 and after unscrewing screw 59 knob 56 is acted upon to slide carriage 48 in the required direction and by the suitable distance. When the required position of pad 44 is reached screw 59 is screwed down again to fix all parts in position.

Similarly for obtaining a satisfactory work cutter 42 must be made to pass just between the small plates 66 and 74 of the presser-foot (Fig. 4). This result may be obtained by adjusting the position of the presser-foot and this by acting upon knob 93 after having unscrewed the locking screw 95 (Fig. 3); block 71 moves to the required position and it only remains to screw down again screw 95.

When cutting cardboard or leather there is used a cutter of which the cutting edge is only cutting as shown in Figs. 8 and 9. If however the material to be cut is more resistant as in the case of bakelised cardboard or soft metals such as zinc, aluminum, brass, copper, soft steel, etc., it is advantageous to use a cutter of which the cutting edge shown at 96 in Figs. 10 and 11 has the shape of a saw. Fig. 11 shows that a certain "set" is ensured for the saw thus obtained.

It is to be understood that the invention is not limited to the embodiment just described and that without departing from its scope any minor modifications which would seem necessary may be made to the construction of the machine.

I claim:

1. A machine for cutting sheet materials comprising in combination a cutter support mounted for reciprocating movement in a substantially vertical direction, a thin narrow cutter parallelly fixed to the cutter support and having a cutting edge slightly oblique relatively to the vertical, means acting on the cutter support for making the cutting edge of the cutter describe an ellipse with its major axis vertical, said means comprising an eccentric connected to the upper end of the cutter support and a guide pivotally mounted on a fixed horizontal axis and embracing the cutter support adjacent its lower end so that the cutter support can freely slide longitudinally therein, a horizontal table beneath the cutter, said table having a slot therein in alignment with the cutter for reception of the cutting edge of the cutter, and a bifurcated presser foot disposed about the cutter above the slot.

2. A machine for cutting sheet materials comprising in combination a cutter mounted for reciprocating movement in a substantially vertical direction, a horizontal table positioned beneath the cutter, said table having a slot therein in alignment with the cutter for reception of the cutter, a presser foot positioned above the slot and having two independent branches disposed on opposite sides of the cutter, and an individual spring urging each branch of the presser foot toward said table to enable the two branches to assume different levels independently of each other.

3. A machine for cutting sheet materials comprising in combination a cutter mounted for reciprocating movement in a substantially vertical direction, a horizontal table positioned beneath the cutter, said table having a slot therein in alignment with the cutter for reception of the cutter, a presser foot positioned above the slot and having two independent branches disposed on opposite sides of the cutter, an individual spring urging each branch of the presser foot toward said table to enable the two branches to assume different levels independently of each other, means for positively raising each of the two branches of the presser foot, and means for maintaining the branches in the raised position.

DAVID TAUBÉ.

REFERENCES CITED

The following references are of record in the file of this patent:

UNITED STATES PATENTS

| Number | Name | Date |
|---|---|---|
| Re. 17,139 | Vulliet et al. | Nov. 20, 1928 |
| 10,986 | Harroday | May 30, 1854 |
| 187,383 | Hodson | Feb. 13, 1877 |
| 783,438 | Kastenhuber | Feb. 28, 1905 |
| 1,498,499 | Wells | June 17, 1924 |
| 1,693,301 | Kopp | Nov. 27, 1928 |
| 1,796,812 | Steindorff et al. | Mar. 17, 1931 |
| 2,492,330 | Smith | Dec. 27, 1949 |